United States Patent
Hosseini et al.

(10) Patent No.: US 8,720,470 B2
(45) Date of Patent: May 13, 2014

(54) INTELLIGENT EMERGENCY SHUT DOWN SYSTEM AND A METHOD FOR EMERGENCY CLOSING AND REGULATION OF FLUID STREAM IN FLUID STORAGE AND DISPENSING SYSTEMS DURING EARTHQUAKE

(76) Inventors: Abdollah Hosseini, Tehran (IR); Vahid Saadatmand, Tehran (IR); Reza Giyahi, Tehran (IR)

( * ) Notice: Subject to any disclaimer, the term of this patent is extended or adjusted under 35 U.S.C. 154(b) by 96 days.

(21) Appl. No.: 13/371,435

(22) Filed: Feb. 12, 2012

(65) Prior Publication Data
US 2013/0206236 A1  Aug. 15, 2013

(51) Int. Cl.
*F16K 17/38* (2006.01)

(52) U.S. Cl.
USPC ........... 137/80; 137/39; 137/236.1; 251/61.1; 138/93

(58) Field of Classification Search
USPC ............. 137/39, 44, 78.5, 79, 80, 236.1, 342, 137/355.2; 138/93; 251/61.1
See application file for complete search history.

(56) References Cited

U.S. PATENT DOCUMENTS

| | | | | |
|---|---|---|---|---|
| 3,990,464 | A * | 11/1976 | Jenkins | 137/1 |
| 4,492,095 | A * | 1/1985 | Brister | 62/293 |
| 4,662,269 | A * | 5/1987 | Tartaglino | 454/255 |
| 4,783,045 | A * | 11/1988 | Tartaglino | 251/61.1 |
| 4,841,287 | A * | 6/1989 | Flig et al. | 340/690 |
| 5,234,374 | A * | 8/1993 | Hyzyk et al. | 454/322 |
| 5,370,147 | A * | 12/1994 | Brusse et al. | 137/15.11 |
| 5,404,923 | A * | 4/1995 | Yamamoto et al. | 141/279 |
| 5,655,561 | A * | 8/1997 | Wendel et al. | 137/79 |
| 5,960,807 | A * | 10/1999 | Reyman | 137/1 |
| 6,123,093 | A * | 9/2000 | D'Antonio et al. | 137/78.3 |
| 6,217,441 | B1 * | 4/2001 | Pearman et al. | 454/333 |
| 6,374,850 | B1 * | 4/2002 | Timm | 137/78.5 |
| 6,691,724 | B2 * | 2/2004 | Ford | 137/1 |
| 6,938,637 | B2 * | 9/2005 | McGill et al. | 137/39 |
| 6,990,393 | B2 * | 1/2006 | Parker | 700/282 |
| 7,302,959 | B2 * | 12/2007 | Gonia | 137/2 |
| 8,459,296 | B2 * | 6/2013 | Gosis et al. | 137/355.2 |
| 2002/0079470 | A1 * | 6/2002 | Chen | 251/61.1 |
| 2004/0163705 | A1 * | 8/2004 | Uhler | 137/79 |
| 2009/0050224 | A1 * | 2/2009 | Lundman | 138/93 |
| 2010/0263729 | A1 * | 10/2010 | Khonkar | 137/1 |

* cited by examiner

*Primary Examiner* — John K Fristoe, Jr.
*Assistant Examiner* — R. K. Arundale
(74) *Attorney, Agent, or Firm* — Barry Choobin; Patent 360 LLC

(57) ABSTRACT

The various embodiments herein disclose a system and a method for regulating a flow of fluid stream in fluid storage and dispensing systems. The system comprising a valve arrangement including a compressed air unit bloated by a connecting air inlet tube, a frame and a valve elevating means to mount the valve arrangement on the frame, several sensors to detect one crisis factor, a communication unit, a data logger and processing unit, a remote management system and several actuators to regulate the operation of the valve arrangement. The valve arrangement shuts down the outflow of fluid stream on receiving a valve shutdown signal from one of the sensors and data processing unit in case of a crisis detection. The data processing unit informs the remote management system to take adequate safety measures through the communication unit.

15 Claims, 2 Drawing Sheets

INTELLIGENT EMERGENCY SHUT DOWN SYSTEM AND A METHOD FOR EMERGENCY CLOSING AND REGULATION OF FLUID STREAM IN FLUID STORAGE AND DISPENSING SYSTEMS DURING EARTHQUAKE

BACKGROUND

1. Technical Field

The embodiments herein generally relate to an emergency safety systems used in fluid storage and dispensing systems and particularly relate to safety valve mechanisms for fluid storage and dispensing systems and more particularly relate to an automatic intelligent emergency safety valve system for regulating a flow of fluid stream from the fluid storage systems. The embodiments herein more particularly relate to an intelligent emergency safety valve system which automatically shuts down a fluid flow in a fluid storage and dispensing system during various crisis conditions such as earth quake, natural calamity, disaster management in oil industry, petrochemical chemical industry, chemical industries etc.

2. Description of the Related Art

Generally the reservoirs are used to store water and various other fluids. The reservoirs may be created in the river valleys by the construction of a dam or may be built by an excavation in the ground or by the conventional construction techniques such as brickwork or cast concrete. Similarly, a storage tank is a container, usually for holding the liquids, sometimes for the compressed gases etc. The fluid stored in the reservoirs or the storage tanks are circulated to various areas through the artificial canals or pipes. The pipes connected to the storage tanks for the transportation of the stored fluids to the distant places are generally made up of a metallic material. These canals and the pipes are more susceptible to damages during natural calamities, sabotage and terrorist attacks or chemical pollution. During any such emergency condition, the walls of the supply pipes and the canals may get damaged at various sites and fluids continue to flow for a long duration. This leads to a huge loss of life and property in the concerned area.

Various methods have been proposed for a timely shut down of the fluid stream to eradicate the problems arising due to the damages in the canals and the supply pipes. The conventional methods for ceasing the water flow through the fluid dispensing systems implements a sensor based system. The sensor-based systems used in the existing methods provide a sensor near the inlet and the outlet of the storage tanks. Whenever there is any indeterminate leakage of the fluid from the storage tank and the reservoirs, the sensor detects the leakage and sends an alarm to a receiving station. The receiving station then sends a manual aid to shut down/stop the flow of fluid. Since the manual aid takes a lot of time to respond over the damage caused due to the continuous water leakage, the existing methods become inefficient in terms of time and require a huge labor cost.

In another method, an automatic fluid shut down method is implemented to stop the leakage of fluid through the supply canals and the pipes. The existing methods implement a sensor at the inlet and outlet of the conduits attached with the storage tanks and the reservoirs. Whenever there is any leakage in an area of contact between the conduit and the storage tank, an automatic system is activated to stop the fluid flow. But during natural calamities the conduits attached with the storage tanks and the reservoirs get damaged at many places. So the existing methods fail to detect and avoid the damages occurred at the sites other than the inlet and outlet of the storage tanks and the reservoirs.

In view of the foregoing, there is a need for an intelligent emergency system and method to automatically shut down the fluid outflow during emergency/crisis conditions. There is also a need for an intelligent system and method to facilitate easy installation at various fluid exit locations to reduce a rapid fluid discharge. Further there also exists a need for a system and method, which is more reliable in terms of efficiency, cost and time-consumption.

The abovementioned shortcomings, disadvantages and problems are addressed herein and which will be understood by reading and studying the following specification.

OBJECTS OF THE EMBODIMENTS

The primary objective of the embodiments herein is to provide an intelligent emergency shutdown system and method to instantly shut down the fluid outflow from fluid storage systems during crisis conditions such as earth quakes, natural disasters, calamities, etc., in chemical industry, petrochemical industry, oil industry and refineries.

Another objective of the embodiments herein is to provide an intelligent emergency shutdown system and method, which enables a selection of suitable points in the fluid storage and dispensing systems for the installation of regulatory safety valves.

Another objective of the embodiments herein is to provide an intelligent emergency shutdown system and method, which automatically senses a crisis condition for a shutdown of the fluid outflow in time.

Another objective of the embodiments herein is to provide an intelligent emergency shutdown system and method with a high speed processing system to reduce a data manipulation and a communication delay.

Another objective of the embodiments herein is to provide an intelligent emergency shutdown system and method, which is reliable, less expensive, and have less operational time.

These and other objects and advantages of the embodiments herein will become readily apparent from the following detailed description taken in conjunction with the accompanying drawings.

SUMMARY

The various embodiments herein provide an intelligent emergency shutdown system for regulating a flow of fluid stream in the fluid storage and dispensing systems. The system has a valve arrangement comprising a compressed air unit bloated by a connecting air inlet tube, a frame and a valve elevating means to mount the valve arrangement on the frame, a plurality of sensors to detect at least one of a crisis factor, a communication unit, a data logger and processing unit, a remote management system and one or more actuators. The valve arrangement shuts down an outflow of a fluid stream upon receiving a valve shutdown signal from at least one of the plurality of sensors and the data logger and processing unit in case of crisis factor detection and informs the remote management system through the communication unit to take adequate safety measures.

According to an embodiment herein, the crisis factors comprise at least one of an earthquake with a measured acceleration higher than the actual level, a fluid discharge speed more than the defined standard level resulted from a braking down in a downstream, dropping of fluid level of the fluid storage to the defined standard as the operating criterion of the valve arrangement, detecting a presence of harmful external substances based on a measurement of defined densities of pollutants, detecting a necessity of fluid stream shut down from inside the fluid storages for repair or replacement of the valves or output connections of the fluid storages, a pressure drop more than the defined standard in the fluid storages as the operation standard of the valve arrangement, detecting smoke, heat, explosion and impact more than the defined standard level and detecting the conditions of passive defense and avoiding a terrorist attack in the fluid storages, vital arteries and other installations.

According to an embodiment herein, the plurality of sensors comprises at least one of an acceleration sensor to measure a vertical and horizontal acceleration of earthquake, an outlet velocity sensor to measure a velocity of the passing fluid stream, a master level sensor to measure a fluid level in the fluid storages, a contaminant densimeter sensor to measure a concentration of the pollutants and the external harmful substances, a pressure sensor to measure a pressure difference in different points of the fluid, a thermal sensor to measure a temperature in the fluid storages and the dispensing systems containing the fluid, a smoke detection sensor to measure the traces of a smoke in the fluid storages and the dispensing systems and a contact and light sensor to detect an unauthorized entry for subversion.

According to an embodiment herein, the data logger and processing unit comprises a means to receive a data from the plurality of sensors, a means to process the data, a means to compare the received data with an actual level, a means to transmit signals to the actuators to shut down the valve arrangement if the data exceeds the actual level, a means to transmit signals to the remote management system and a means to receive the operation instructions from the remote management system.

According to an embodiment herein, the actuator turns off the valve arrangement to shut an outflow of the fluid stream by injecting a compressed air to the connecting air tube based on the signals received from the data logger and processing unit. The actuator is also adapted to turn on the valve arrangement to resume the flow of the fluid stream by discharging an air from the connecting air tube based on the signals received from the data logger and processing unit. The actuators are adapted to function in at least one of an automatic mode or manual mode.

According to an embodiment herein, the compressed air units are activated with at least two air compressor systems or by a stimulating chemical detonator.

According to an embodiment herein, the communication system is at least one of wired and wireless communication mediums to communicate an operating condition of the valve arrangement to the remote management systems.

According to another embodiment herein, wherein the communication system is at least one of a wired and wireless communication medium to communicate the operation instructions received from the remote management system to the valve arrangement.

According to an embodiment herein, a valve arrangement is adapted to be installed in front of an exit in at least one of fluid storage tanks, service tanks, point of line of fluid supply, entrance of fluid outlets, pumping stations, exit of dams, exit of urban and rural fluid treatment facilities to shut down the outflow of the fluid stream.

According to an embodiment herein, the valve arrangement is provided with an operating speed high enough to nullify a pressure of the fluid present inside the fluid storage and simultaneously discharging the fluid pressure to the fluid storages.

The embodiments herein further provide a method for regulating a flow of fluid stream in the fluid storage and dispensing systems. The method comprising steps of providing a valve arrangement at an exit of the fluid storage and dispensing systems to regulate an outflow of fluid stream, detecting a presence of at least one of a plurality of crisis factors using a plurality of sensors, processing the data received from the plurality of sensors, comparing the processed data with an actual data, providing a valve close signal to the actuator in response to detection of a crisis factor, applying an actuation signal to the valve arrangement for a predetermined time upon receiving the valve close signal, shutting down the valve arrangement to prevent the outflow of the fluid and informing a remote management system with the operating condition of the valve arrangement to take adequate safety measures.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The other objects, features and advantages will occur to those skilled in the art from the following description of the preferred embodiment and the accompanying drawings in which.

Figure 1:
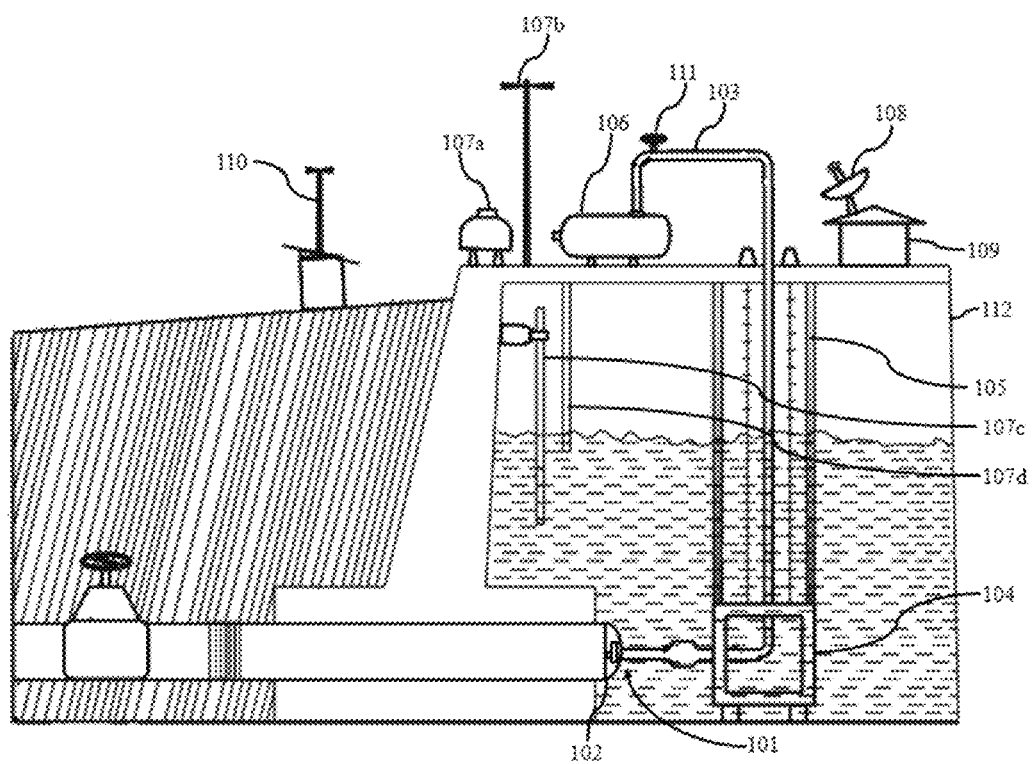
FIG. 1 is a schematic representation of an intelligent emergency shutdown system for regulating an outflow of a fluid stream in the fluid storage and dispensing systems, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an intelligent emergency shutdown system for regulating a flow of fluid stream from the fluid reservoirs or other fluid storage systems. The system comprising a valve arrangement, a plurality of sensors to detect at least one of a crisis factor, a communication unit, a data logger and processing unit, a remote management system and one or more actuators. The valve arrangement comprises a compressed air unit bloated by a connecting air inlet tube, a frame and a valve elevating means to mount the valve arrangement on the frame. The valve arrangement shuts down the outflow of fluid stream on receiving a valve shutdown signal from at least one of the plurality of sensors and the data processing unit in case of crisis detection and informs the remote management system through a communication unit to take adequate safety measures.

The crisis conditions being taken into account in the present embodiment comprises at least one of an earthquake with a measured acceleration higher than an actual value, a fluid discharge speed in an output tube of the reservoir or transmission lines more than the defined standard value resulted from a braking down in a downstream, a dropping of fluid level of the tank as compared with the defined standard as the operating criterion of the valve arrangement, detecting a presence of contamination or harmful external substances based on a measurement of the defined densities of pollutants, detecting a necessity of fluid stream shut down from inside the tank for repair or replacement of the valves or output connections of the fluid tank, a pressure drop with a value more than the defined standard pressure drop value in the tanks or tubes as the operation standard of the valve arrangement, detecting smoke, heat, explosion and impact with value exceeding the defined standard value and detecting the conditions of passive defense and avoiding a terrorist attack in the tanks, vital arteries and all the other outstanding buildings and installations and the like.

The valve arrangement is activated based on the information gathered through the pluralities of sensors. The sensors are being implemented herein to supply a valuable data about various parameters. The plurality of sensors comprise an acceleration sensor to measure a vertical and horizontal acceleration of earthquake; an outlet velocity sensor to measure a velocity of the passing fluid stream, a master level sensor to measure a fluid level in the fluid reservoir, a contaminant densimeter sensor to measure a concentration of the pollutants and external harmful substances, a pressure sensor to measure a pressure difference in different points of the fluid, a thermal sensor to measure a temperature in the reservoirs and the pipelines containing the fluid, a smoke detection sensor to measure the traces of smoke in the reservoirs and pipelines containing the fluid and a contact and light sensor to detect an unauthorized entry for subversion.

The acceleration sensor herein measures the various acceleration parameters such as vertical and horizontal acceleration of earthquake. The data thus collected is stored in the memory unit of the data logger and processing unit connected with the acceleration sensor and is compared against a safety value pre-fed in the data logger and processing unit. When the vertical and horizontal parameters (adjudged by the acceleration sensor) exceed the pre-fed safety value, the data logger and processing unit activates the valve arrangement to regulate or completely shut down the fluid flow.

The master level sensor continuously senses the level of the fluid in the reservoir. The data collected by the level master sensor is stored and processed in the data logger and processing unit. Whenever the level of fluid in the reservoir is more than a pre-fed safety value, the data logger and processing unit activates the valve arrangement to evacuate the excess water. The water evacuation is done by supplying excess water to a predetermined location. The location for water evacuation is determined by a remote management system, which continuously receives the data from the data logger and processing unit. The remote management system consists of a transponder and a memory unit. The transponder receives the data send from the data logger and processing system and sends the instruction to the data logger and processing unit. The data received from the data logger and processing unit is further processed to determine an appropriate location for an evacuation of the excess fluid in the reservoir. Furthermore, the data logger and processing unit intimates the remote management system whenever the fluid level in the reservoir falls below a pre-fed safety value, so as to take adequate compensatory measures.

The contaminant densimeter sensor collects the data on the presence of contaminants in the fluid and sends the data to the data logger and processing unit. The data logger and processing unit has a database of wide range of contaminants, their components and their safety value. When the level of contaminants in the fluid of the reservoir exceeds the safety value, the data logger and processing unit activates the valve arrangement to shut down the fluid outflow. Simultaneously, the data logger and processing unit send the corresponding information to the remote management system.

The pressure sensor is provided at various sites along the supply pipe to measure a pressure difference in different points of the fluid. The pressure sensed at different points of the fluid is measured and the collected information is sent to the data logger and processing unit. The data logger and processing unit compare the different pressure values. If the pressure of the fluid at one point differs from the pressure data collected from another point, then it detects/symbolizes that there is fluid leakage at the corresponding site. The data logger and processing activates the valve arrangement to shut down the fluid flow. Simultaneously the data logger and processing unit sends a corresponding alert to the remote management system to take necessary steps.

Similarly, the thermal sensor and smoke detection sensors are provided to measure the temperature of the fluid and to measure traces of smoke in the reservoirs and pipelines. The sensors update the measured value in the data logger and processing unit and compares with the standard pre-fed safety value. If the temperature sensed by the thermal sensor crosses a pre-fed safety value or if traces of smoke are detected, then the data logger system activates the valve arrangement to regulate the flow of the fluid. Simultaneously the data logger and processing unit sends a corresponding alert to the remote management system to take necessary safety measures.

The data logger and processing unit herein comprises a means to receive a data from the plurality of sensors, a means to process the data, a means to compare the received data with the actual data, a means to transmit signals to the actuators to shut down the valve arrangement if the received data exceeds the actual data, a means to transmit signals to the remote management system and a means to receive operation instructions from the remote management system.

The actuator turns off the valve arrangement to shut down an outflow of the fluid stream by injecting a compressed air to the connecting air tube based on the signals received from the data logger and processing unit. The actuator is adapted to turn-on the valve arrangement to resume the flow of fluid stream by discharging an air from the connecting air tube based on the signals received from the data logger and processing unit. The actuator is adapted to function under automatic mode as well as manual mode. The compressed air units are activated with at least two air compressor systems. The compressed air unit is activated by stimulating a chemical detonator.

The communication system is at least one of a wired and wireless communication medium to communicate the operating condition of the valve arrangement to the remote management systems. The communication system is at least one of a wired and wireless communication medium to communicate the operation instructions received from the remote management systems to the valve arrangement.

The valve arrangement is adapted to be installed in front of an exit of atleast one of fluid storage tanks, service tanks, point of line of fluid supply, entrance of fluid outlets, pumping stations, exit of dams, exit of urban and rural fluid treatment facilities to shut down the outflow of the fluid stream. The valve arrangement is provided with an operating speed high enough to nullify the pressure of the fluid inside the reservoir and simultaneously discharging the fluid pressure to the reservoir.

The embodiments herein further disclose a method for regulating a flow of fluid stream from the fluid storage systems. The method comprising steps of providing a valve arrangement at an exit of the fluid storage systems to regulate the outflow of fluid stream, detecting a presence of at least one of a plurality of crisis factors using a plurality of sensors, processing the data received from the plurality of sensors, comparing the processed data with actual, providing a valve close signal to the actuator in response to detection of a crisis factor, applying an actuation signal to the valve arrangement for a predetermined time upon receiving the valve close signal, shutting down the valve arrangement to prevent the outflow of the fluid and informing a remote management system with the operating condition of the valve arrangement to take adequate safety measures.

FIG. 1 is a schematic representation of a system for regulating the outflow of fluid stream from fluid storage systems, according to an embodiment herein. With respect to FIG. 1, the system comprises a valve arrangement 101 for regulating the flow of fluid or to completely shut down the flow of fluid under certain crisis factors. The system further comprises a a plurality of sensors 107a to 107d to detect at least one of the crisis factor, a communication unit 108, a data logger and processing unit 109, a remote management system 110 and one or more actuators 111.

The valve arrangement 101 herein comprises of a compressed air unit 102 bloated by a connecting air inlet tube 103, a frame 104 and a valve elevating means 105 to mount the valve arrangement 101 on the frame 104. The compressed air unit 102 is further connected with a compressor 106 with provides the supply of compressed air to the compressed air unit 102. The compressor 106 is placed on an upper surface of the reservoir 112 (on the ground surface). The compressor 106 sucks-in the air from the atmosphere, compresses the air to a very high density and supplies to the compressed air unit 102 through the air inlet tube 103. The valve arrangement 101 shuts down the outflow of fluid stream on receiving a valve shutdown signal from at least one of the plurality of sensors 107a-107d and data logger and processing unit 109 in case of crisis detection and informs the remote management system 110 through a communication unit 108 to take adequate safety measures.

The valve arrangement 101 is further connected with an actuator 111. The actuator 111 turns off the valve arrangement 101 to shut the outflow of the fluid stream by injecting compressed air to the connecting air tube 103 based on the signals received from the data logger and processing unit 109. The actuator 111 is also adapted to turn on the valve arrangement to resume the flow of fluid stream by discharging the air from the connecting air inlet tube 103 based on the signals received from the data logger and processing unit 109. The actuator 111 has an automatic control over the various components connected to it. The compressed air unit 109 is activated with at least two air compressors 106 or by a stimulating chemical detonator.

The valve arrangement 101 is adapted to be installed in front of the exit in at least one of fluid storage tanks, service tanks, point of line of fluid supply, entrance of fluid outlets, pumping stations, exit of dams, exit of urban and rural fluid treatment facilities to shut down the outflow of the fluid stream. The valve arrangement 101 is provided with an operating speed which is high enough to nullify the pressure of the fluid inside the reservoir 112 and simultaneously discharging the fluid pressure to the reservoir 112.

The valve arrangement is activated on the basis of information gathered through pluralities of sensors 107a-107d. The plurality of sensors herein comprises an acceleration sensor 107a, a contact and light sensor 107b, a level meter sensor 107c, contaminant densimeter sensor 107d. The plurality of sensors 107a-107d implemented herein is to supply valuable data about various parameters. The acceleration sensor 107a is implemented herein to measure vertical and horizontal acceleration of earthquake, the pressure sensor measures the pressure of the flowing fluid at various points, the contact and light sensor 107b detects any unauthorized entry for subversion and terrorist attacks into the certain places, the master level sensor 107c measures the fluid level in the fluid reservoir, the contaminant densimeter sensor 107d collects the data on the presence of contaminants in the fluid. The data collected by the plurality of sensors 107a-107d is provided to the data logger and processing unit 109 which processes the data and compares the measured value with the standard safety values pre-fed in the memory of the data logger and processing unit 109. If the measured value exceeds the standard pre-fed values, the data logger and processing unit 109 transmit alert signals to the actuators 111 to shut down the valve arrangement 101. Simultaneously, the data logger and processing unit 109 transmits alert signals to the remote management system 110 for alerting the remote management system to take necessary safety measurement actions against the detected crisis factors.

The remote management system 110 consists of a transponder and a memory unit (not shown). The transponder is capable of receiving the data sent from the data logger and processing unit 109. The transponder is able to detect a wide range of signals. Thus the transponder is also able to detect very weak signals sent by the data logger and processing unit 109. The transponder is further adapted to send the operational instructions to the data logger and processing unit 109. The communication unit 108 provided herein is at least one of a wired and wireless communication medium to communicate the operating condition of the valve arrangement 101 to the remote management system 110. The communication unit 108 is at least one of a wired and wireless communication medium to communicate the operation instructions received from the remote management system 110 to the valve arrangement 101.

Figure 2:
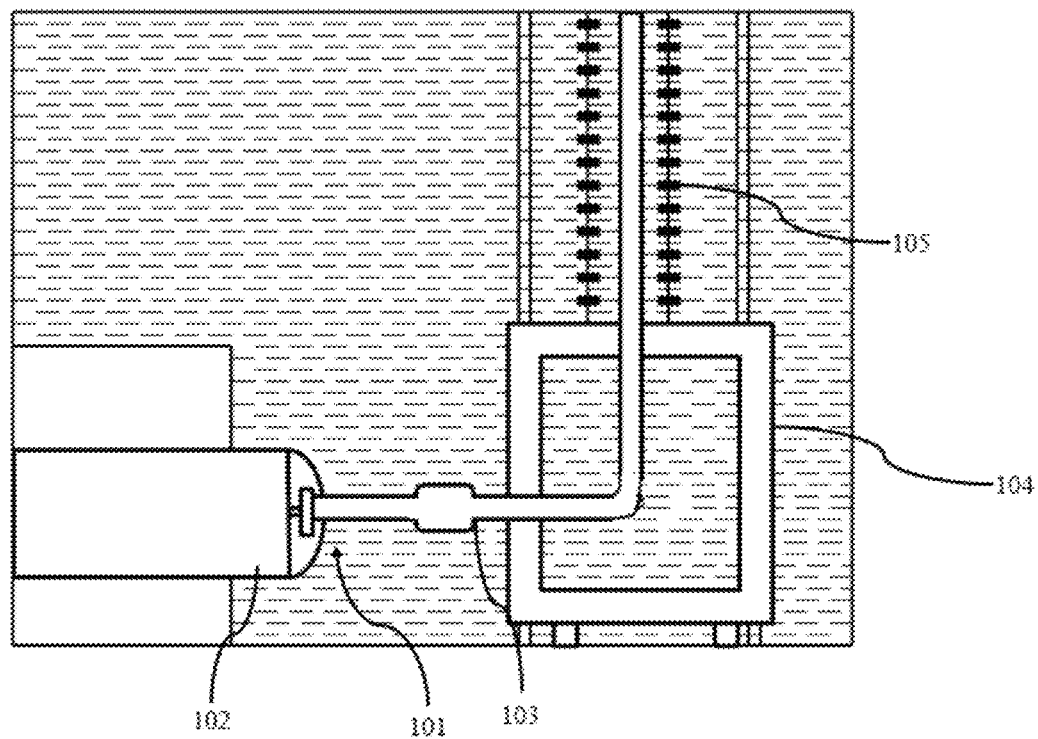
FIG. 2 is a schematic diagram illustrating a flow control valve arrangement provided in the system shown in FIG. 1.

FIG. 2 is a schematic diagram illustrating a flow control valve arrangement in provided in the system as shown in FIG. 1. With respect to FIG. 2, the valve arrangement 101 herein is facilitating the regulation in the flow of fluid or completely shuts down the flow of fluid under certain emergency conditions. The valve arrangement 101 herein comprises a compressed air unit 102 bloated by a connecting air inlet tube 103, a frame 104 and a valve elevating means 105 to mount the valve arrangement 101 on the frame 104. The compressed air unit 102 is further connected with a compressor with provides the supply of compressed air to the compressed air unit 102. The compressor is placed at the upper surface of the reservoir (on the ground surface). The compressor sucks-in the air from the atmosphere, compresses the air to a very high density and supplies the compressed air to the compressed air unit 102 through an air inlet tube 103. The compressed air unit 102 is further connected with a valve elevating means 105. The valve elevating means 105 is basically a rack and pinion system that adjusts the vertical height of the valve arrangement 101. The fluid in the reservoir is transferred to various places through a supply pipe.

The valve arrangement 101 is adapted to be installed in front of an exit in at least one of fluid storage tanks, service tanks, point of line of fluid supply, entrance of fluid outlets, pumping stations, exit of dams, exit of urban and rural fluid treatment facilities to shut down the outflow of the fluid stream. The valve arrangement 101 is provided with an operating speed high enough to nullify the pressure of the fluid inside the reservoir and simultaneously discharging the fluid pressure to the reservoir.

The system according to the embodiments can be installed in the water storage systems under construction by providing a formulated instruction to the manufactures to design the system in accordance with the specifications of the fluid storage systems under construction.

The system can also be installed in fluid storage systems which are already in operation. The installation can be accomplished on the roof of the fluid storage systems through the formulated instructions. This installation does not require the fluid stream to be shut down or draining of the storage tanks.

The valve arrangement herein is provided with a susceptibility of being applied in various types of channels and reservoirs in different industries such as oil industry, petrochemical industry, chemistry and the like regarding the capabilities considered in designing.

The automatic actuator, data logger and processing unit and the remote management system supplement the reliability in regulating the flow of fluid in the reservoir. Moreover the high processor in the data logger and processing unit ensures the in-time response to various emergency conditions. The pluralities of sensors and data logger and processing unit reduce the maintenance cost and time to a large extent.

The system according to the embodiments herein is capable of controlling, receiving the commands and operate automatically in order to confront the terrorist attacks and passive defense management. The system is highly economical and exhibits industrial self sufficiency and entrepreneurship, which is consistent with rapid access to performance and efficiency. The system has several applications in water and wastewater industry, oil, gas, petrochemical industry and is capable of avoiding local floods resulted from a breakdown of tubes and possible damages and strategic water conservation in specific circumstances.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. An intelligent emergency shut-down system for regulating a flow of fluid stream in fluid storage and dispensing systems, the system comprising: a valve arrangement comprising a compressed air unit which includes a compressor which sucks in air, compresses the air to a density and supplies the compressed air to the compressed air unit bloated by a connecting air inlet tube, wherein said air is ambient air;

a frame and a valve elevating means to mount the valve arrangement on the frame wherein said valve elevating means comprises a rack and pinion system that adjusts vertical height of the valve arrangement; a plurality of sensors to detect at least one of a crisis factor; a communication unit; a data logger and processing unit; a remote management system; and one or more actuators, wherein the valve arrangement shuts down an outflow of a fluid stream on receiving a valve shutdown signal from at least one of the plurality of sensors, wherein said sensors com rise an acceleration sensor a contact and light sensor, level meter sensor and a contaminant densimeter, and the data logger and processing unit in case of detection of a crisis factor informs the remote management system through the communication unit to take adequate safety measures.

2. The system of claim 1, wherein the crisis factor comprises at least one of: an earthquake with a measured acceleration value higher than an actual acceleration value; a fluid discharge speed which is more than a defined standard value resulted from a braking down of pipes in downstream; a dropping fluid level of the fluid storage compared to a predefined standard value set as an operating criterion value of the valve arrangement; detecting a presence of harmful external substances based on a measurement of defined densities of pollutants; detecting a necessity of fluid stream shut down from inside the fluid storages for repair or replacement of the valves or output connections of the fluid storages; a pressure drop which is more than a defined standard value in the fluid storages as the operation standard of the valve arrangement; detecting a smoke, a heat, an explosion and an impact more than a pre defined standard value; and detecting a condition of passive defense and avoiding terrorist attack in the fluid storages, vital arteries and other installations.

3. The system of claim 1, wherein the plurality of sensors comprises at least one of: an acceleration sensor to measure a vertical and a horizontal acceleration of an earthquake; an outlet velocity sensor to measure a velocity of a passing fluid stream; a master level sensor to measure a fluid level in the fluid storages; a contaminant densimeter sensor to measure a concentration of pollutants and external harmful substances; a pressure sensor to measure a pressure difference between fluid pressure values at different points in the fluid storage; a thermal sensor to measure a temperature in the fluid storages and the dispensing systems containing the fluid; a smoke detection sensor to measure traces of smoke in the fluid storages and the dispensing; and a contact and light sensor to detect an unauthorized entry for subversion and terrorist attacks.

4. The system of claim 1, wherein the data logger and processing unit comprises: a means to receive a data from the plurality of sensors; a means to process the received data; a means to compare the received data with the measured value and the standard safety values pre-fed in the memory of the data logger and processing unit; a means to transmit signals to the actuators to shut down the valve arrangement when the received data exceeds the standard safety values; a means to transmit signals to the remote management system; and a means to receive operation instructions from the remote management system.

5. The system of claim 1, wherein the actuator turns off the valve arrangement to shut the outflow of the fluid stream by injecting a compressed air to the connecting air tube based on the signals received from the data logger and processing unit.

6. The system of claim 1, wherein the actuator is adapted to turn on the valve arrangement to resume the flow of fluid stream by discharging air from the connecting air tube based on the signals received from the data logger and processing unit.

7. The system of claim 1, wherein the actuators are automatic.

8. The system of claim 1, wherein the compressed air unit is activated with at least two air compressor system.

9. The system of claim 1, wherein the compressed air unit is activated by a stimulating chemical detonator.

10. The system of claim 1, wherein the communication system is at least one of a wired and wireless communication medium to communicate an operating condition of the valve arrangement to the remote management systems.

11. The system of claim 1, wherein the communication system is at least one of a wired and wireless communication medium to communicate the operation instructions received from the remote management systems to the valve arrangement.

12. The system of claim 1, wherein the valve arrangement is adapted to be installed in front of an exit in at least one of fluid storage tanks, service tanks, point of line of fluid supply, entrance of fluid outlets, pumping stations, exit of dams, exit of urban and rural fluid treatment facilities to shut down the outflow of the fluid stream.

13. The system of claim 1, wherein the valve arrangement is provided with an operating speed high enough to nullify a pressure of the fluid stored inside a reservoir and simultaneously discharging a fluid pressure to the reservoir whenever the fluid level in the reservoir falls below a pre-fed safety value.

14. A method for regulating a flow of a fluid stream in fluid storage and dispensing systems, the method comprising steps of: providing a valve arrangement at an exit of the fluid storage and dispensing systems to regulate an outflow of a fluid stream, wherein the valve arrangement includes a compressor which sucks in air, compresses the air to a density and supplies the compressed air to a compressed air unit bloated by a connecting air inlet tube, wherein said air is ambient air, and wherein said valve arrangement further comprises a valve elevating means which comprises a rack and pinion system that adjusts vertical height of the valve arrangement; detecting a presence of an at least one of a plurality of crisis factors using a plurality of sensors wherein said sensors comprise an acceleration sensor, a contact and light sensor, level meter sensor and a contaminant densimeter; processing a data received from the plurality of sensors; comparing the processed data with an actual data; providing a valve close signal to an actuator in response to a detection of a crisis factor; applying an actuation signal to the valve arrangement for a predetermined time upon receiving the valve close signal; shutting down the valve arrangement to prevent the outflow of the fluid; and informing a remote management system regarding an operating condition of the valve arrangement to take adequate safety measures.

15. The method of claim 14, wherein the plurality of crisis factors comprises at least one of: an earthquake with a measured acceleration higher than the actual; a fluid discharge speed exceeding a predefined standard resulted from a braking down of pipes in downstream; dropping fluid level of the fluid storage to the predefined standard as an operating criterion value of the valve arrangement; detecting a presence of harmful external substances based on a measurement of predefined densities of pollutants;

detecting a necessity of a fluid stream shut down from inside the fluid storages for a repair or a replacement of the valves or output connections of the fluid storages; a pressure drop exceeding a predefined standard value in the fluid storages which is set as an operation standard of the valve arrangement; detecting a smoke, a heat, an explosion and an impact more than the predefined standard; and detecting a condition of passive defense and avoiding terrorist attack in the fluid storages, vital arteries and other installations.

\* \* \* \* \*